US007987840B2

(12) United States Patent
Magner et al.

(10) Patent No.: US 7,987,840 B2
(45) Date of Patent: Aug. 2, 2011

(54) DELAY COMPENSATED AIR/FUEL CONTROL OF AN INTERNAL COMBUSTION ENGINE OF A VEHICLE

(75) Inventors: Stephen William Magner, Farmington Hills, MI (US); Mrdjan J. Jankovic, Birmingham, MI (US); James Michael Kerns, Trenton, MI (US); Alan Robert Dona, Huntington Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/759,958

(22) Filed: Apr. 14, 2010

(65) Prior Publication Data

US 2011/0132341 A1 Jun. 9, 2011

(51) Int. Cl.
*F02D 41/00* (2006.01)
*G01M 15/10* (2006.01)

(52) U.S. Cl. ...... 123/703; 123/488; 701/103; 73/114.73

(58) Field of Classification Search .................. 701/101, 701/105, 109; 123/488, 494–496, 703, 704; 702/189, 190, 193, 196, 197; 73/114.72, 73/114.73

See application file for complete search history.

(56) References Cited

U.S. PATENT DOCUMENTS

| | | | | |
|---|---|---|---|---|
| 5,469,826 | A * | 11/1995 | Thomas et al. | 123/488 |
| 5,515,280 | A * | 5/1996 | Suzuki | 701/29 |
| 5,642,722 | A * | 7/1997 | Schumacher et al. | 123/673 |
| 5,819,714 | A * | 10/1998 | Bush et al. | 123/673 |
| 5,983,155 | A * | 11/1999 | Bederna et al. | 701/104 |
| 7,530,220 | B2 * | 5/2009 | Miller et al. | 60/274 |
| 7,810,476 | B2 * | 10/2010 | Wang et al. | 123/568.16 |
| 7,918,082 | B2 * | 4/2011 | Noirot et al. | 60/274 |
| 2005/0211233 | A1 * | 9/2005 | Moulin et al. | 123/673 |
| 2005/0228572 | A1 * | 10/2005 | Mansbart | 701/108 |
| 2005/0267669 | A1 * | 12/2005 | Wang et al. | 701/102 |
| 2006/0271271 | A1 * | 11/2006 | Chauvin et al. | 701/109 |

OTHER PUBLICATIONS

Smith, Otto J.M., "A Controller To Overcome Dead Time," ISA Journal, vol. 6, No. 2, Feb. 1959, 6 pages.

Jankovic, Mrdjan J. et al., "Method and System for Exhaust Gas Recirculation Control," U.S. Appl. No. 12/854,067, filed Aug. 10, 2010, 38 pages.

* cited by examiner

*Primary Examiner* — John T Kwon
*Assistant Examiner* — Johnny H Hoang
(74) *Attorney, Agent, or Firm* — Julia Voutyras; Alleman Hall McCoy Russell & Tuttle LLP

(57) ABSTRACT

A fuel control approach that compensates for time delays to increase exhaust gas sensor feedback response speed.

20 Claims, 7 Drawing Sheets

DELAY COMPENSATED AIR/FUEL CONTROL OF AN INTERNAL COMBUSTION ENGINE OF A VEHICLE

BACKGROUND AND SUMMARY

Closed loop fuel/air control may be enhanced in terms of response speed and accuracy by using a linear or a wide band continuous universal exhaust gas oxygen (UEGO) sensor versus a switching type exhaust gas oxygen (EGO) sensor.

However, the inventors have recognized several potential issues with such an approach. For example, closed loop fuel/air control using the UEGO sensor is still hindered by exhaust gas path dynamics. Specifically, a relatively large time delay (time between a fuel change and the first indication of a measured fuel/air ratio response) exists that destabilizes the closed loop fuel/air control, resulting in low gain feedback control with sluggish response speed. This limits the ability to properly regulate aggressive modulation of the exhaust feed gas which reduces catalyst efficiency. Moreover, it compromises the ability to facilitate disturbance rejection, making the control approach more vulnerable to conditions of reduced drivability.

The inventors herein have developed a closed loop fuel control system for an engine that compensates for the time delay to increase the response speed of the fuel control. For example, the system includes a reference input to produce a desired fuel/air signal, a delay compensation filter to receive a sum of the desired fuel/air signal and a fuel/air control signal output from a proportional-integral controller, the delay compensation filter providing a delay compensation signal, a filtered desired fuel/air signal used to calculate an error signal, an exhaust gas sensor to provide a fuel/air ratio signal that is subtracted from the filtered desired fuel/air signal and this result is added to the delay compensation signal to produce an error signal being provided to the proportional-integral controller to produce the fuel/air control signal, and a transient fuel control filter to adjust the fuel/air control signal according to an engine temperature dependent time constant and an engine temperature dependent gain to produce an engine temperature dependent delay compensated fuel/air control signal.

As an example, the delay compensation filter may be a Smith Predictor feedback control loop (Smith, O. J., "A controller to overcome dead-time," ISA Journal, Volume 6, pg 28-33, 1959). The Smith Predictor feedback control loop includes a model that separately characterizes the time delay of the control system and the continuous time dynamics of the controlled system. The Smith Predictor feedback control loop can be modified to avoid interfering with the conventional fuel control system that makes feed forward adjustments based on reference changes due to, for example, varying driver's demand, yet still provide delay compensation to maintain stability of the closed loop system with high control gain. The conventional Smith Predictor and the modified version described here allow the controller to regulate the continuous dynamics of the system, only adjusting for delay when the measured signal differs from the Smith Predictor's estimate.

Furthermore, by feeding the delay compensated fuel/air control signal through the transient fuel control filter, the control signal may be adjusted based on engine temperature in order to compensate the effects of fuel puddle dynamics. In other words, as the rate of fuel evaporation in the intake ports of the engine vary with engine temperature, the fuel control signal can be adjusted to maintain accurate fuel control. In this way, accuracy of the fuel control response can be increased resulting in increased emissions control device efficiency and fuel economy. This closed loop adjustment for the fuel puddle dynamics is independent of and in addition to any conventional open loop transient fuel compensation adders that are a standard automotive control practice.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

BRIEF DESCRIPTION OF THE DRAWINGS

The subject matter of the present disclosure will be better understood from reading the following detailed description of non-limiting embodiments, with reference to the attached drawings, wherein.

DETAILED DESCRIPTION

Figure 1:
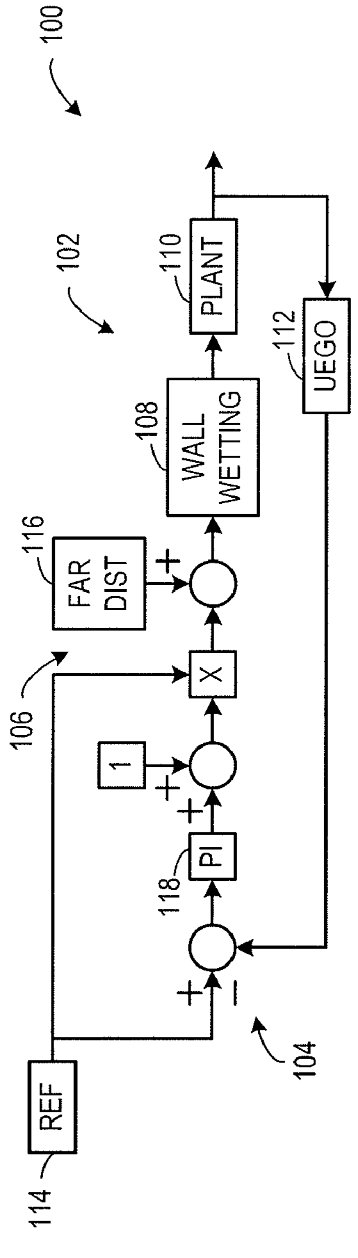
FIG. 1 is a block diagram of a conventional closed loop fuel control system without delay compensation.

FIG. 1 shows a closed loop fuel control system 100 (referred to herein as "control system") that operates based on feedback from a linear or universal exhaust gas oxygen (UEGO) sensor without compensating for a response delay of the UEGO sensor. The control system 100 varies fuel/air ratio based on operating conditions. A reference source 114 generates a desired signal at the input of control system 100 that is adjusted by various intermediate control blocks to provide a desired fuel control signal to a plant block 110 at the output of the control system. The desired fuel signal may be generated by the reference source based on the desired fuel/air ratio, which another part of the control system determines, to optimize emissions, fuel economy, and drivability. In these figures, the reference is assumed to be normalized fuel/air ratio, i.e. will be a value of 1 when the fuel and air inducted into the combustion cylinders has exactly enough fuel and oxygen to burn without any leftover fuel or oxygen (referred to as a stoichiometric mixture). The control system 100 includes a physical system section 102, a feedback control section 104, and a feed forward control section 106.

The physical system section 102 includes various blocks that represent physical components of a vehicle that are modeled for fuel control. The physical system section 102 includes a fuel/air disturbance block 116, a wall wetting block 108, the plant block 110, and a UEGO sensor block 112. The disturbance block 116 represents fueling errors that exist in a real engine such as inaccurate fuel delivery (injector variability, fuel pressure, etc.), fuel that doesn't match expected chemical composition (example: gasoline-ethanol blends), fuel that enters through the canister purge valve, fuel from the puddle after a large airflow change that the TFC failed to completely account for, etc.). A disturbance is essentially any error that the system designers can not accurately anticipate and thus can only be countered by closed loop control. The wall wetting block 108 models an estimated amount of fuel that sticks to intake port walls and forms a fuel puddle that later evaporates to affect the fuel/air ratio, and may be characterized as the so-called X-Tau model as one example. The wall wetting block 108 is connected in series to the plant block and provides input to the plant block 110. The plant block 110 models an internal combustion and exhaust gas flow dynamics of an engine of a vehicle. The section 102 receives the desired fuel signal to command fuel injection as part of a fuel/air control strategy. The UEGO sensor block 112 measures the actual fuel/air ratio in the exhaust from the internal combustion engine and provides the measured value as feedback into the feedback control section 104.

The feedback control section 104 provides the difference of the control signal from reference source 114 and the feedback signal from UEGO sensor block 112 to a proportional-integral (PI) controller 118. The PI controller 118 drives the control system based on the error (difference between the output of the control system and the reference or desired signal). Accordingly, the desired fuel/air signal controls operation of the engine to drive the measured fuel/air ratio to the desired fuel/air ratio.

The feed forward control section 106 provides the control signal from reference source 114 to be multiplied with the one fuel/air ratio plus the error compensated output of PI controller 118 (when no error is present the PI controller will settle to a value of 0). This representation of the feed forward system indicates stoichiometric mixture when the value is 1. To understand this structure, when there is no error or desired adjustment, the overall control system will command a fuel/air ratio of one, which is a perfect match of fuel and air for combustion (which in another part of the control system will ultimately convert this to fuel injection commands). The feed forward reference can alter this fuel/air ratio from one (by multiplying the result by a value above or below one) as can the closed loop controller. The intent of the feed forward control section 106 is to allow the fuel system to operate independently of the closed loop system. The closed loop system is not enabled when the engine first starts cold, and when the UEGO is taken offline for on board diagnostic tests, and various other reasons. Therefore, the fuel controller must operate reasonably well for periods of time without closed loop assistance. In order to represent how the controller interacts with the physical system, the fuel/air control plus reference signal is then summed with the output of fuel/air ratio disturbance block 116 and provided to the wall wetting block 108 of physical system section 102.

As discussed above, closed loop fuel control in automotive applications has been made more capable by the replacement of switching exhaust gas oxygen (EGO) sensor with a wide-band continuous UEGO sensor. With the UEGO sensor, fuel injection can be controlled by a standard feedback approach, such as control system 100. However, control system 100 does not compensate for a delay from the time the control system takes the action (injects fuel) until the result is seen at the UEGO sensor. The delay includes the time to combust the cylinder charge, transport time for the burned gas to reach the sensor, and a delay of the sensor itself. The delay destabilizes the control system 100, resulting in low gain feedback control that has a sluggish response. The sluggish response inhibits the ability of control system 100 to properly regulate aggressive modulation of the exhaust feed gas which then compromises catalyst efficiency, in some cases requiring larger and more precious metal intensive catalysts to meet a given emission standard. Additionally, sluggish response compromises the disturbance rejection ability of control system 100, making the system more vulnerable to drivability concerns for the aggressive use of canister purge, presence of hesitation fuel, aggressive driving during engine cold operation where the fuel puddle is difficult to compensate for, etc.

Figure 2:
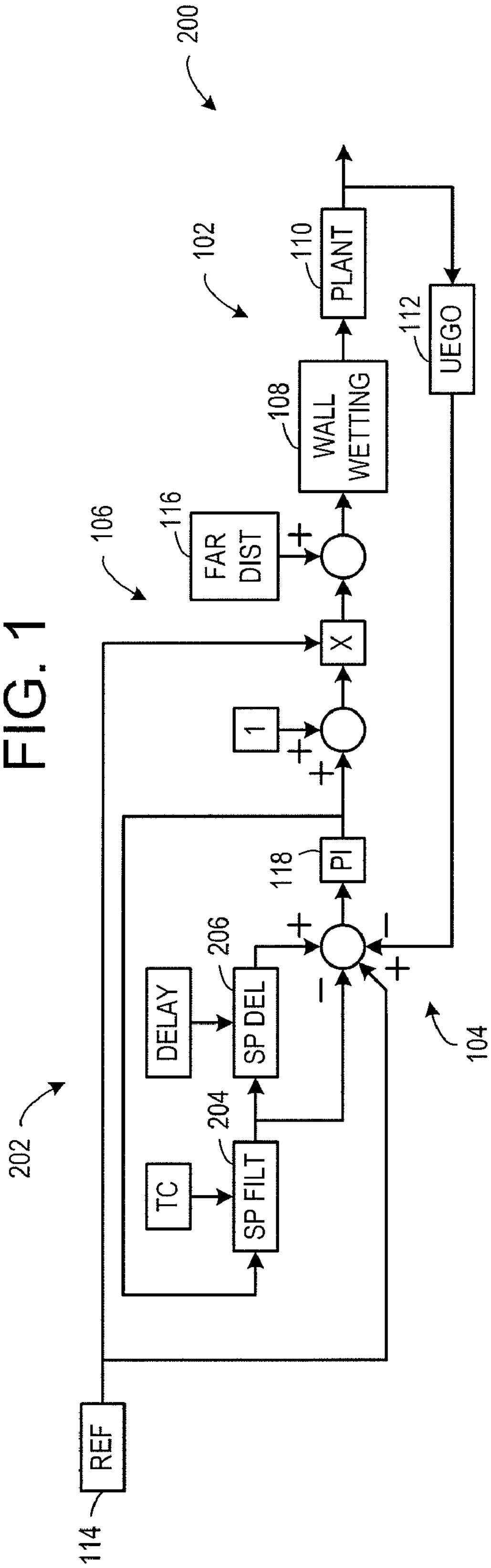
FIG. 2 is a block diagram of a closed loop fuel control system including a Smith Predictor (SP) feedback control loop.

FIG. 2 shows a closed loop fuel control system 200 that includes a Smith Predictor (SP) control section 202 to compensate for the response delay of the UEGO sensor. The SP control section 202 acts as a lead filter to compensate for disturbances related to the time delay of the control system. The SP control section 202 includes an SP filter or prediction block 204 connected in series with an SP delay block 206 so that the SP delay block receives the output of the SP filter block. The SP control section 202 includes an inner feedback loop in which the control signal output from the PI controller 118 is fed back to the input of the SP filter block 204. Block 204 uses a time constant that is a function of engine speed and load (normalized cylinder air charge). Block 206 uses a delay that is also a function of engine speed and load. The Smith Predictor provides two estimated signals: the response of the system with the pure delay (output of 206) and without it (output of 204). The Smith Predictor will allow the PI controller to essentially operate as if the actual system did not have the pure delay or is delay-free, as long as the output of the 206 and measured signal from 112 match one another. In the case of a reference change, assuming no disturbance and that the blocks 204 and 206 have a correctly identified SP model of the actual system, this assumption is met and the system will respond as if no delay existed. If a disturbance occurs, then the error will be detected as a difference between the SP model (206) and the measured (112) system, which the controller will try to correct. In this way, the closed loop system is stabilized by the delay compensator, so much so that higher gains can be used. Because of this, the controller's response to a disturbance has a peak error that is somewhat reduced, and the duration of the error that is greatly reduced. For the application of fuel control, this makes the delay compensation very valuable, since it minimizes the integrated error of fuel/air ratio going to the catalyst, which can only absorb a limited amount of fuel/air deviation from stochiometry.

The outputs of blocks 114, 204, 206, 112 are summed together, with appropriate sign, to provide a delay compensated error signal to the PI controller 118.

Components of control system 200 that may be substantially the same as those of control system 100 are identified in the same way and are described no further. However, it will be noted that components identified in the same way in different embodiments of the present disclosure may be at least partly different.

The issue with control system 200 of FIG. 2 is the existence of both the feed forward section 106 and the conventional Smith Predictor (blocks 204, 206). A reference change will be addressed by both sections, causing the system to overreact, i.e. overshoot the reference target and only after some time return to the intended value. The preferable way to avoid this problem is make the two systems cooperate and gain the advantages of both.

Figure 3:
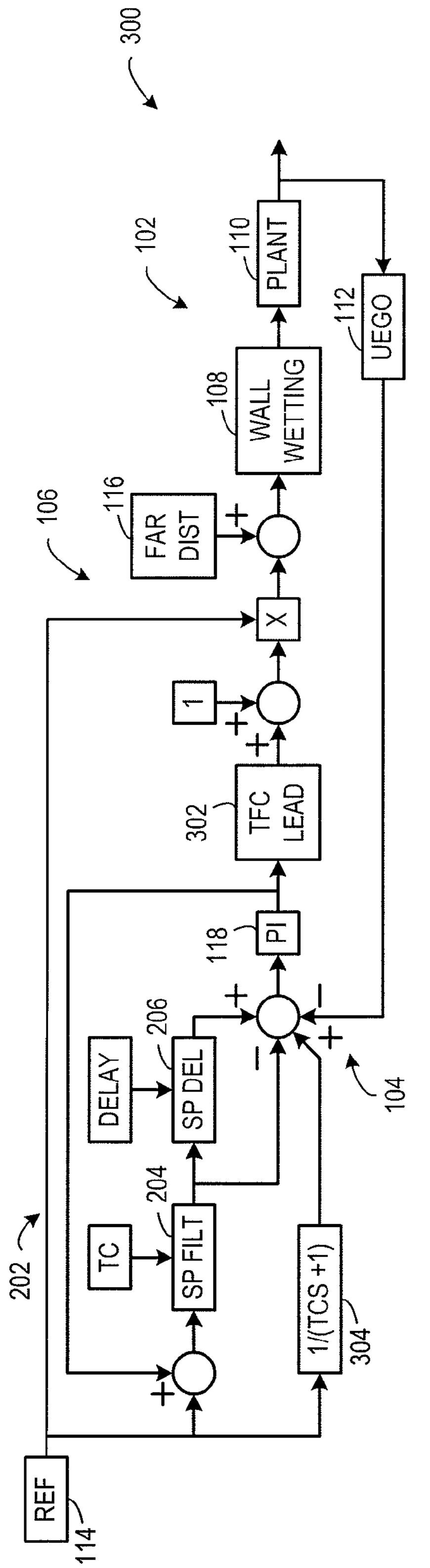
FIG. 3 is a block diagram of a closed loop fuel control system with a modified Smith Predictor including a transient fuel control (TFC) compensator.

FIG. 3 shows a closed loop fuel control system 300 that alters the Smith Predictor structure. The first change is that the reference at 114 now is summed into the node that feeds the block 204. Effectively, we are informing the Smith Predictor that a reference change has occurred and the deviation due to this should not be interpreted as an error to aggressively pursue (remember the feed forward section is already taking action, but the feedback section will not immediately know it without this modification). The second change is filtering the reference input with the filter (304) before the summing node that inputs into the PI controller. These two changes allow the feed forward controller to dominate the response to reference change. If for some reason the system deviates from this expected reference response, the presence of the Smith Predictor will still address this. Finally setting the time constant of 304 equal to the value used in 204 makes the system output (measured at 112) respond to the reference change with no overshoot. If an application engineer is willing to tolerate some over shoot, the reference response can be increased by reducing the time constant in 304, selecting the appropriate tradeoff. It is important to note that these modifications only affect the Smith Predictor's response to reference changes, but do not change its response to disturbances.

FIG. 3 also includes a transient fuel control (TFC) lead compensator 302 to reduce the effects of the fuel puddle's resistance to change. The closed loop system would eventually overcome the fuel puddle's interference, but this would add additional error duration. Since we can estimate the puddle's dynamic effect we can use this knowledge to make the closed loop control output react more forcefully on a control signal change, in particular when the engine is cold.

Figure 4:
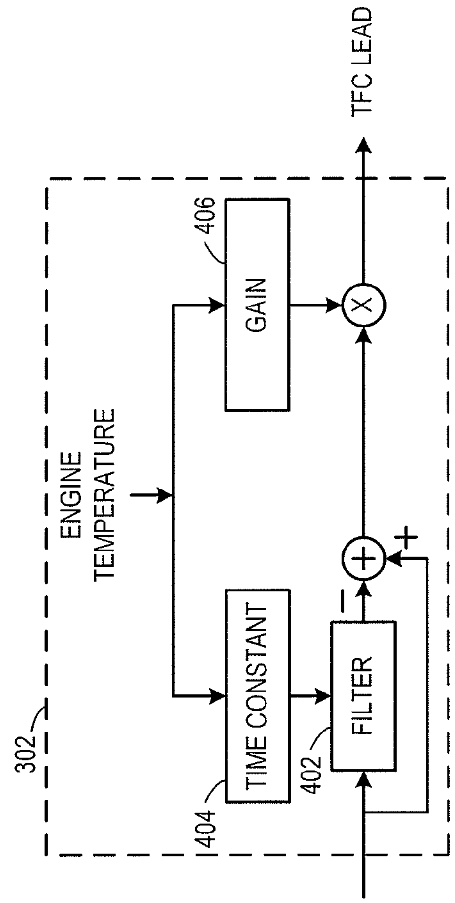
FIG. 4 is a block diagram of the TFC compensator of FIG. 3.

FIG. 4 shows the TFC lead compensator 302 in more detail. The TFC lead compensator 302 introduces modifiers that are engine temperature dependent so as to compensate for the effects of wall wetting. That is, the compensator is introduced to remove or reduce the effect of wall wetting in which a fraction of injected fuel sticks to the fuel injection port walls and forms a fuel puddle that later evaporates. The rate of evaporation is dependant on engine temperature so disturbances caused by the evaporating fuel can be estimated based on the engine temperature.

The TFC lead compensator 302 receives the delay-compensated control signal from the output of PI controller 118. The control signal is fed through a low pass filter 402 having an engine temperature dependant time constant 404. A difference of the delay-compensated control signal and the output of the first order filter 402 is multiplied by a gain 406 that is based on engine temperature. In other words, TFC lead compensator 302 adjusts the fuel/air control signal received from PI controller 118 based on an engine temperature dependent time constant and a temperature dependent gain to produce an engine temperature dependent fuel/air control signal. The control signal that is modified by the engine temperature dependent time constant and high frequency gain is fed to the feed forward control section 106 which outputs the desired fuel control signal to the physical system section 102.

The TFC lead compensator 302 reduces or compensates for the effects of wall wetting modeled in wall wetting block 108 on the control system to increase the accuracy of feedback control. The TFC lead compensator 302 is constrained to preserve closed loop stability as opposed to other compensators which merely provide open loop control that ignores closed loop actions. Further, the TFC lead compensator 302 is less complex than other such compensators.

Components of control system 300 that may be substantially the same as those of control systems 200 and 100 are identified in the same way and are described no further. However, it will be noted that components identified in the same way in different embodiments of the present disclosure may be at least partly different.

The control system 300 operates in a fuel/air ratio domain in order to conveniently scale response of the control system to changes in airflow. However, under some conditions operating in the fuel/air ratio domain may either slow the response of the control system or make it overreact. For example, dynamic elements of the control system (e.g., an integral control term such as in the PI controller) can carry over a value that is no longer appropriate after a sudden large change in airflow. By carrying over the value after a change has occurred, an under- or over-reaction is caused which hinders the feedback response of the control system 300. Further, some of the disturbances the control system is designed to suppress can be characterized as fuel mass (or fuel flow) disturbances. By operating in the fuel/air ratio domain, the disturbances are not easily suppressed and add to the overall response error.

Figure 5:
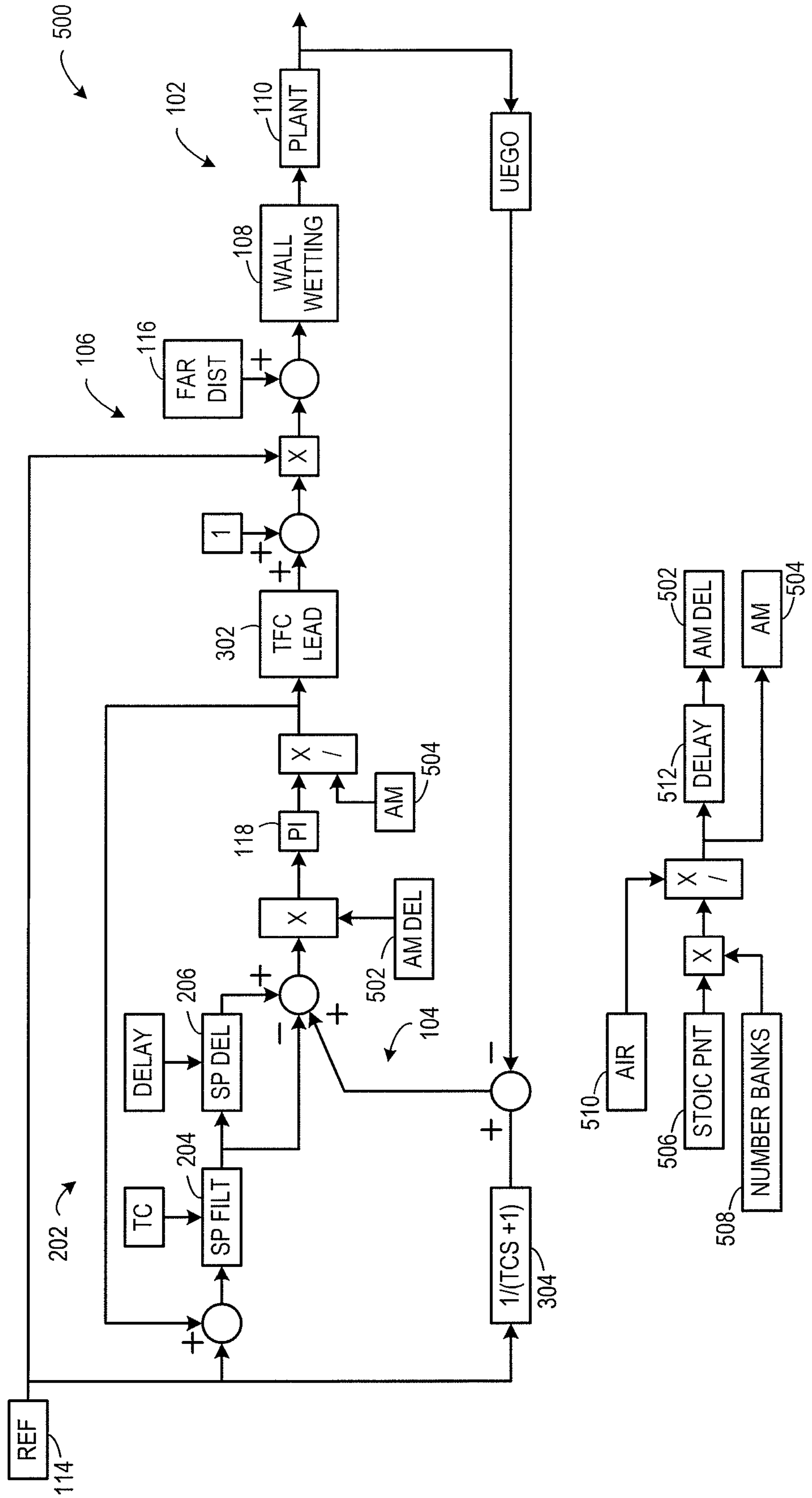
FIG. 5 is a block diagram of a closed loop fuel control system with the modified Smith Predictor, TFC lead compensation, operable in a fuel mass mode.

FIG. 5 shows a closed loop fuel control system 500 that is operable in a fuel mass mode. The control system 500 includes dynamic elements that during the fuel mass mode operate in terms of fuel mass or fuel flow (instead of fuel/air ratio) to alleviate delays associated with carrying fuel/air ratio values for a time after a significant change in airflow has occurred. Furthermore, by operating in the fuel mass domain, fuel flow disturbances can be accommodated while maintaining a constant feedback gain for the whole feedback control loop. The measured fuel/air ratio output by UEGO sensor block 112 is converted or scaled into the fuel mass domain at the input of the controller by multiplying the error signal from the node that sums the outputs from blocks 204, 206, 304, and 112 with a delayed air mass or air flow (AM DEL) term 502. Because the fuel/air ratio is measured with a delay, an equally delayed air mass, AM DEL, is used for scaling the fuel/air ratio at the input to control system. Also, the control signal that is output from PI controller 118 is divided by term AM 504, an un-delayed air mass quantity. The fuel mass mode is confined to scaling the PI controller, effectively scaling the integral error into fuel mass.

As an example, the AM term 504 may be calculated by multiplying a stoichiometric set point 506 with a corresponding value in 508 indicating the number of engine banks. An air flow term 510 (air coming into the whole engine) is divided by the resulting value to provide the AM term 504. The AM term is input to a delay block 512 which delays the AM term with the same delay as 206 to produce the AM DEL term 502.

By converting the dynamic or memory elements of the control system, such as the integral control, into the fuel mass domain, large load (air-flow) changes can occur with little or no over- or under-correction by the feedback control. Moreover, disturbances associated with fuel mass can be accommodated for in the feedback loop to provide more accurate feedback control with less overshoot. Accordingly, the control system 500 may provide a delay compensated control signal that accounts for the effects of wall wetting as well as fuel mass associated disturbances. In this way, feedback response speed may be increased to provide more accurate closed loop feedback fuel control. Further, the increased response speed facilitates aggressive fuel/air modulation that increases catalyst efficiency and reduces emissions.

It will be appreciated that under some conditions the control system 500 can operate in a first mode in which the dynamic elements of the control system are scaled to the fuel/air ratio domain. Further under some conditions the control system 500 can operate in a second mode in which the dynamic elements of the control system are scaled to the fuel mass domain.

Components of control system 500 that may be substantially the same as those of control systems 300, 200, and 100 are identified in the same way and are described no further. However, it will be noted that components identified in the same way in different embodiments of the present disclosure may be at least partly different.

It will be understood that the example control systems and estimation routines disclosed herein may be used with various system configurations. These control systems and/or routines may represent one or more different processing strategies such as event-driven, interrupt-driven, multi-tasking, multi-threading, and the like. As such, the disclosed process steps (operations, functions, and/or acts) may represent code to be programmed into computer readable storage medium in an electronic control system. Moreover, although the processing stages are represented as blocks of a system diagram, in some embodiments the processing stages may be representative of steps of one or more methods for feedback fuel control. Such method(s) may be performed to control an internal combustion engine of a vehicle.

It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Figure 6:
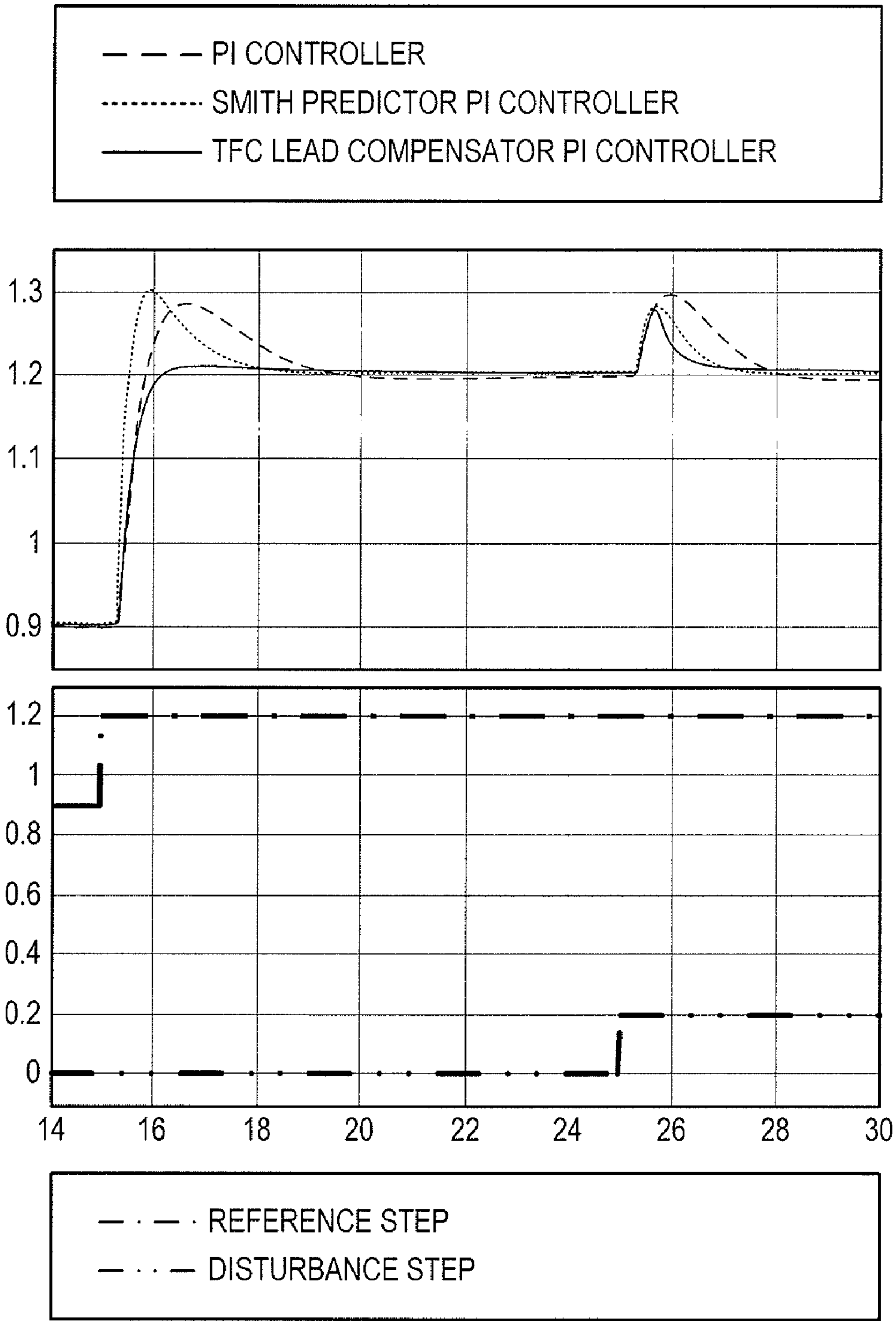
FIG. 6 shows the response of different versions of closed loop fuel control systems to a reference step change and a disturbance step change.

FIG. 6 shows the normalized fuel/air ratio response of different versions of the closed loop fuel control systems described above to a reference input change and a disturbance. The reference step occurs at the 15 second time and is indicated by a dot-dashed line. The disturbance step occurs at the 25 second time and is indicated by the double dot-dashed line.

The response indicated by the dashed line corresponds to control system 100 which does not compensate for feedback delays of the UEGO sensor signal. Further, the control system does not suppress overshoot due to a reference change. Accordingly, the feedback response overshoots the desired reference change and takes the longest amount of time to correct the overshoot resulting in the longest response time of the different versions of the control system.

The response indicated by the dotted line corresponds to control system 200 which compensates for feedback delays associated with the control system via a conventional SP control loop. Accordingly, the feedback response occurs quicker than the response of control system 100, but the response of control system 200 still overshoots the desired reference change before correcting to the desired reference value which extends the response time.

The response indicated by the solid line corresponds to the control system 500 which compensates for feedback delays associated with the control system via a SP control loop. Further, the control system 500 includes engine temperature dependent compensation for wall wetting disturbances in the form of a TFC lead compensator. Further still, the control system 500 includes reference inputs to the control system that lessen the effects of the SP control loop on the reference response. Accordingly, the feedback response of control system 500 has little or no overshoot and tracks the desired reference step more accurately than the responses of the other control systems. The increased accuracy results in an overall quicker feedback response relative to the other control systems.

Figure 7:
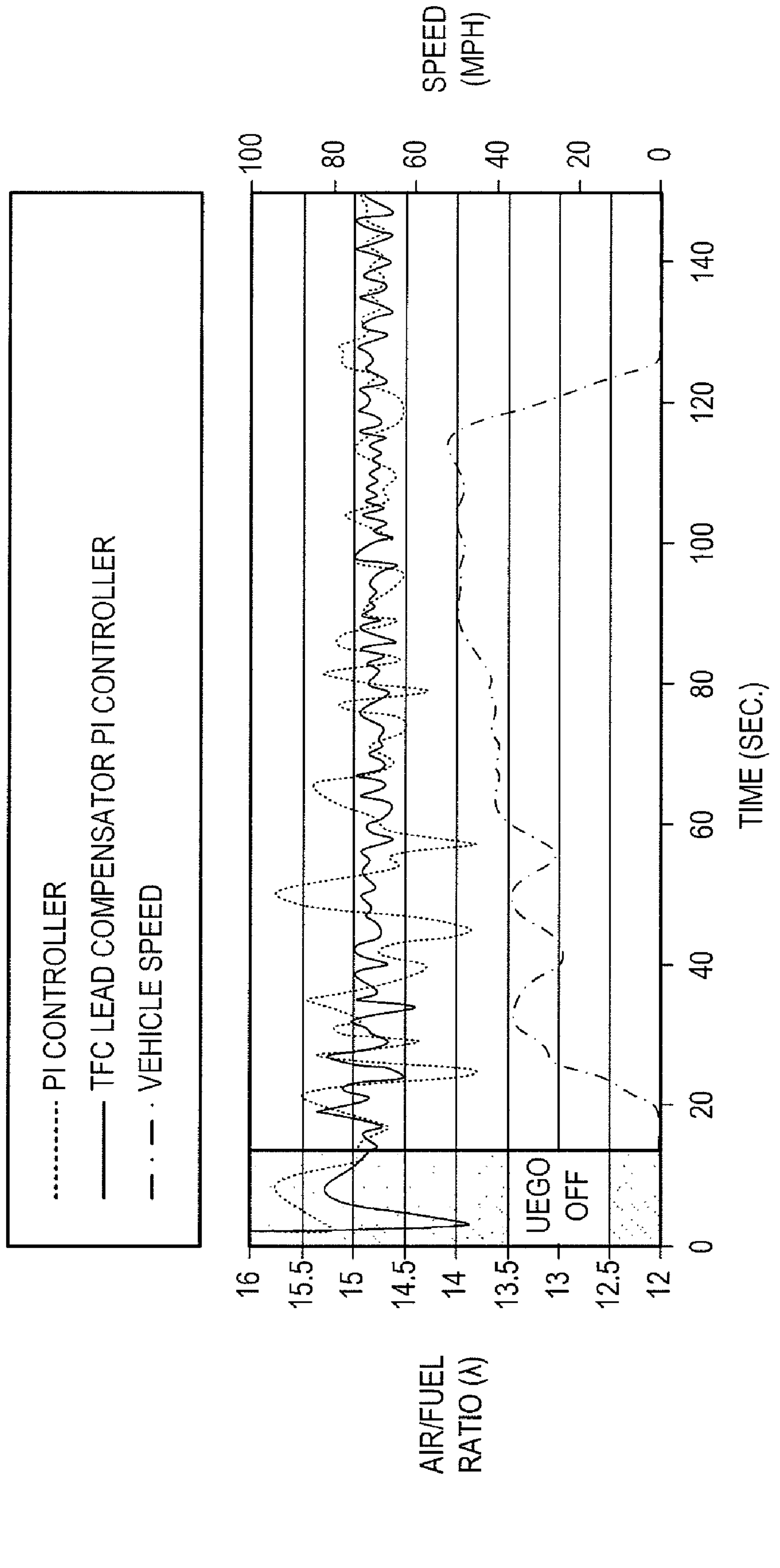
FIG. 7 shows a comparison of fuel control by the closed loop fuel control system of FIG. 1 and the fuel control system of FIG. 5 over a range of vehicle speeds.

FIG. 7 shows a comparison of the air/fuel ratio (data non-normalized, stoichiometry=14.62) of the control system 100 and the control system 500 implemented in a vehicle. The air/fuel ratio of each of the control system is measured over a range of vehicle speed indicated by a dot-dashed line. The air/fuel ratio of control system 100 is indicated by a dotted line. The air/fuel ratio of control system 500 is indicated by a solid line. The above described features of control system 500 provide for delay compensation with little or no overshoot of the desired reference which results in tighter air/fuel ratio control over the entire range of vehicle speed. The increased accuracy facilitates increased catalyst efficiency as shown in FIGS. 8 and 9.

Figure 8:
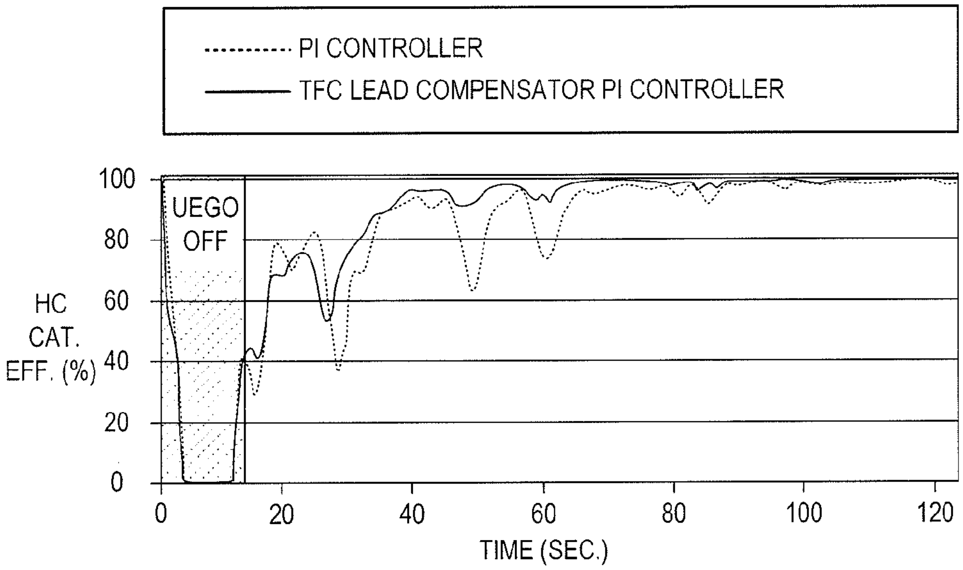
FIG. 8 shows a comparison of hydrocarbon (HC) catalyst efficiency based on air/fuel control by the closed loop fuel control system of FIG. 1 and the fuel control system of FIG. 5.

FIG. 8 shows a comparison of catalyst efficiency of a hydrocarbon (HC) catalyst between the control system 100 and the control system 500 over time. The efficiency of the control system 100 is indicated by a dotted line. The efficiency of the control system 500 is indicated by the solid line. As discussed above and shown in FIG. 8, the increased response accuracy of the control system 500 results in increased catalyst efficiency of the HC catalyst relative to control system 100.

Figure 9:
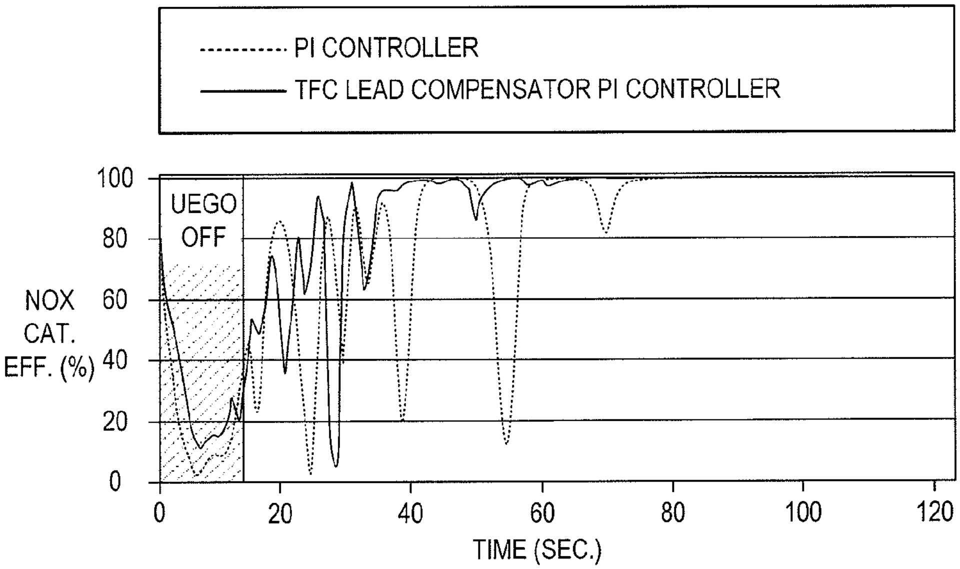
FIG. 9 shows a comparison of $NO_x$ catalyst efficiency based on air/fuel control by the closed loop fuel control system of FIG. 1 and the fuel control system of FIG. 5.

FIG. 9 shows a comparison of catalyst efficiency of a $NO_x$ catalyst between the control system 100 and the control system 500 over time. The efficiency of the control system 100 is indicated by a dotted line. The efficiency of the control system 500 is indicated by the solid line. As discussed above and shown in FIG. 9, the increased response accuracy of the control system 500 results in increased catalyst efficiency of the $NO_x$ catalyst relative to control system 100.

Figure 10:
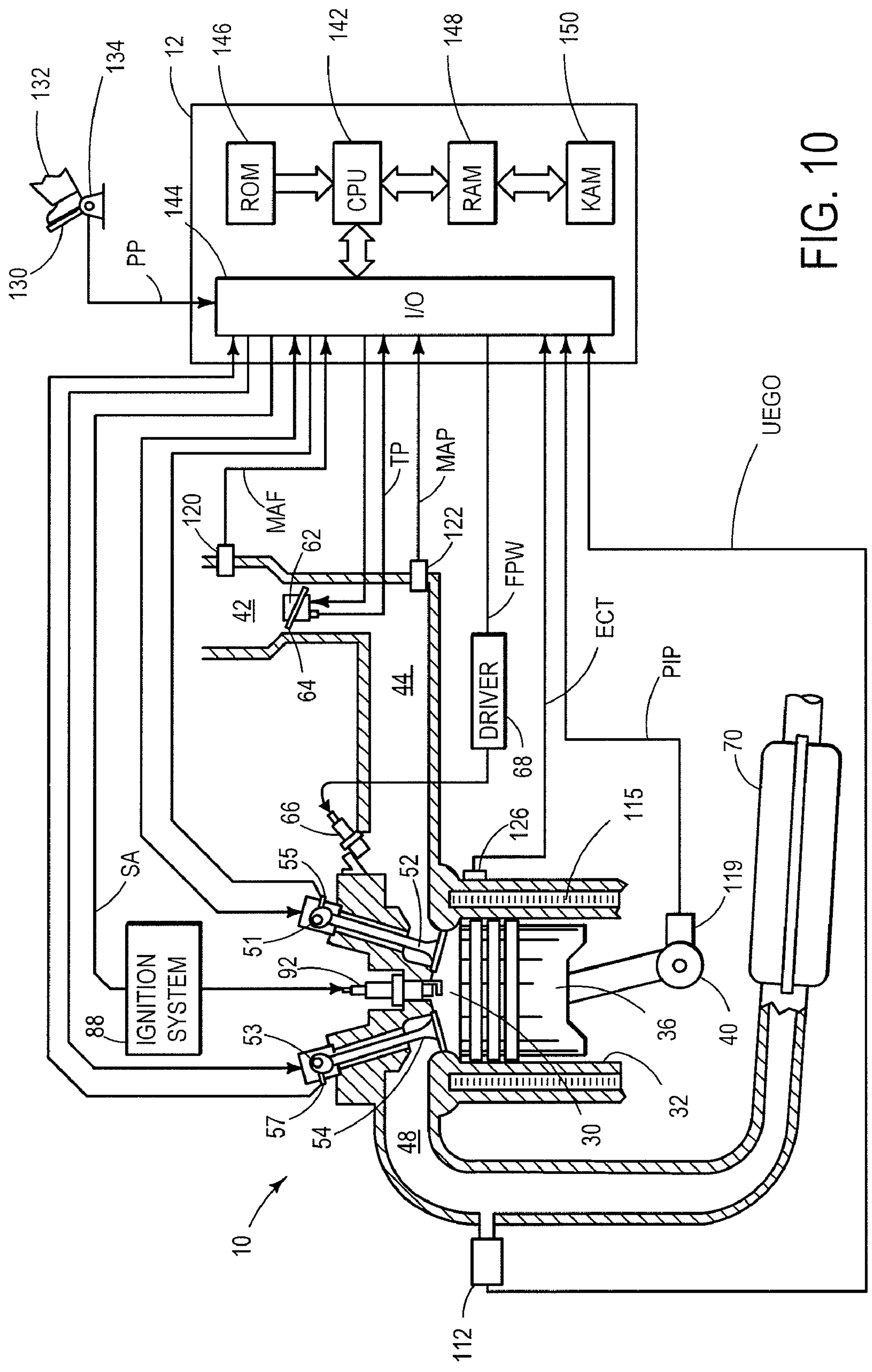
FIG. 10 shows an engine system in which a fuel control system of the present disclosure may be implemented.

FIG. 10 shows one cylinder of a multi-cylinder engine, as well as an intake and exhaust path connected to that cylinder. Engine 10 as illustrated and described herein may be included in a vehicle such as a road automobile, among other types of vehicles. While the example applications of engine 10 will be described with reference to a vehicle, it should be appreciated that engine 10 may be used in other applications not necessarily confined to vehicle propulsion systems.

The closed loop fuel control systems described above with reference to FIGS. 1-5 can be implemented as part of an engine control system to control operation of engine 10. The engine control system includes a controller 12 that receives input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT Fuel injector 66 is shown arranged in intake passage 44 in a configuration that provides what is known as port injection of fuel into the intake port upstream of combustion chamber 30. Fuel injector 66 may inject fuel in proportion to the pulse width of signal FPW received from controller 12 via electronic driver 68. The FPW control signal may be controlled by a fuel control system as described above.

For example, the control system 500 may provide a delay compensated engine temperature dependant fuel control signal based on feedback from UEGO sensor 112. The control system facilitates increased feedback response speed for increased emissions control device efficiency and increased fuel economy. Under some conditions, at least some dynamic elements (e.g., memory elements) of the control system 500 may operate in the fuel mass domain to compensate for fuel mass related disturbances to provide increased feedback tracking accuracy. Under some conditions at least some dynamic elements of the control system 500 may operate in the fuel/air ratio domain.

Fuel may be delivered to fuel injector 66 by a fuel system (not shown) including a fuel tank, a fuel pump, and a fuel rail. In some embodiments, combustion chamber 30 may alternatively or additionally include a fuel injector coupled directly to combustion chamber 30 for injecting fuel directly therein, in a manner known as direct injection.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 112 is shown coupled to exhaust passage 48 upstream of emission control device 70. Sensor 112 may be any suitable sensor for providing an indication of exhaust gas air/fuel ratio such as a linear oxygen sensor or UEGO (universal or wide-range exhaust gas oxygen) as feedback to the control system. Emission control device 70 is shown arranged along exhaust passage 48 downstream of exhaust gas sensor 112. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller 12 is shown in FIG. 1 as a microcomputer, including microprocessor unit 142, input/output ports 144, an electronic storage medium for executable programs and calibration values shown as read only memory chip 146 in this particular example, random access memory 148, keep alive memory 150, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 126 coupled to cooling sleeve 115; a profile ignition pickup signal (PIP) from Hall effect sensor 119 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 119, which is also used as an engine speed sensor, may produce a predetermined number of equally spaced pulses every revolution of the crankshaft.

The above describe engine system including sensors and actuators may be modeled as the physical system section in the above described fuel control systems. The wall wetting block 108, the plant block 110, and the UEGO block 112 are described in more detail, although it should be appreciated that any suitable engine component may be modeled in the physical system of the fuel control system in order to provide a fuel control signal.

Finally, it will be understood that the articles, systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. A closed loop fuel control system for an engine comprising:

a reference input to produce a desired fuel/air signal;

a delay compensation filter to receive a sum of the desired fuel/air signal and a fuel/air control signal output from a proportional-integral controller, the delay compensation filter providing a system delay compensation signal;

an exhaust gas sensor to provide an fuel/air ratio signal that is subtracted from a filtered fuel/air signal and this result is added to the system delay compensation signal to produce an error signal being provided to the proportional-integral controller to produce the delay compensated fuel/air control signal; and a transient fuel control filter to adjust the delay compensated fuel/air control signal according to an engine temperature dependent time constant and an engine temperature dependent gain to produce an engine temperature dependent delay compensated fuel/air control signal.

2. The system of claim 1, wherein the delay compensation filter includes a prediction block and a delay block, the prediction block receiving the sum of the desired fuel/air signal and the fuel/air control signal and adjusting the sum based on a time constant of the system to produce a delay-free control signal that is provided to the delay block, the delay block adjusting the delay-free control signal to be delayed according to a delay of the control system to provide a delayed control signal, the delay-free control signal being subtracted from the delayed control signal to produce the system delay compensation signal.

3. The system of claim 1, further comprising:

a feed forward control to adjust a product of the desired fuel/air signal and the sum of one (in normalized fuel/air ratio units) plus the engine temperature dependent delay compensated fuel/air control signal based on an anticipated timing of a control system event.

4. The system of claim 1, wherein during a first mode of operation of the control system, the delay compensated control signal is produced in a fuel/air ratio domain, and during a second mode of operation of the control system the delay compensated control signal is produced in a fuel mass domain.

5. The system of claim 4, wherein during the second mode of operation of the control system, the error signal is multiplied by a delayed air mass term to convert the error signal to the fuel mass domain.

6. The system of claim 5, wherein during the second mode, the delay compensated control signal from the proportional-integral controller is divided by an air mass term to convert the delay compensated control signal to the fuel/air ratio domain.

7. The system of claim 1, a low pass filter provides the filtered fuel/air signal.

8. The system of claim 1, wherein the fuel/air ratio signal is produced by a linear exhaust gas sensor.

9. The system of claim 1, wherein the transient fuel control filter includes a first order low pass filter with temperature dependent time constant.

10. The system of claim 9, wherein a difference of the delay compensated fuel/air control signal and a signal output from the low pass filter is multiplied by the engine temperature dependant gain to produce the engine temperature dependent delay compensated fuel/air control signal.

11. A closed loop fuel control system for an engine comprising:

a reference input to produce a desired fuel/air signal;

a delay compensation filter including a prediction block and a delay block, the prediction block receiving a sum of the desired fuel/air signal and a delay compensated fuel/air control signal and adjusting the sum based on a time constant of the control system to produce a delay-free control signal that is provided to the delay block, the delay block adjusting the delay-free control signal to be delayed according to a delay of the control system to provide a delayed control signal, the delay-free control signal being subtracted from the delayed control signal to produce a system delay compensation signal.

an exhaust gas sensor to provide an fuel/air ratio signal that is subtracted from a filtered fuel control signal and added to the system delay compensation signal to produce an error signal being provided to a proportional-integral controller to produce the delay compensated control signal;

a transient fuel control filter to adjust the delay compensated control signal according to an engine temperature dependent time constant and an engine temperature dependent gain to produce an engine temperature dependent delay compensated fuel control signal; and a feed forward control to adjust a product of the desired fuel/air signal and a sum of one (fuel/air ratio) plus the engine temperature dependent delay compensated fuel/air control signal based on an anticipated timing of a control system event.

12. The system of claim 11, wherein during a first mode of operation of the control system, the delay compensated control signal is produced in a fuel/air ratio domain, and during a second mode of operation of the control system the delay compensated control signal is produced in a fuel mass domain.

13. The system of claim 12, wherein during the second mode of operation of the control system, the error signal is multiplied by a delayed air mass term to convert the error signal to the fuel mass domain.

14. The system of claim 13, wherein during the second mode, the delay compensated control term is divided by an air mass term to convert the delay compensated control signal to the fuel/air ratio domain.

15. The system of claim 11, wherein a low pass filter provides the filtered fuel control signal.

16. The system of claim 11, wherein the fuel/air ratio signal is produced by a linear exhaust gas sensor.

17. The system of claim 11, wherein the transient fuel control filter includes a first order lead filter.

18. The system of claim 17, wherein a difference of the delay compensated fuel/air control signal and a signal output from the first order lead filter is multiplied by the engine temperature dependent gain to produce the engine temperature dependent delay compensated fuel control signal.

19. A closed loop fuel control system for an engine comprising:

a reference input to produce a desired fuel/air signal;

a delay compensation filter including a prediction block and a delay block, the prediction block receiving a sum of the desired fuel/air signal and a delay compensated fuel/air control signal and adjusting the sum based on a time constant of the control system to produce a delay-free control signal that is provided to the delay block, the delay block adjusting the delay-free control signal to be delayed according to a delay of the control system to provide a delayed control signal, the delay-free control signal being subtracted from the delayed control signal to produce a system delay compensation signal.

an exhaust gas sensor to provide an fuel/air ratio signal that is subtracted from the filtered fuel signal and added to the system delay compensation signal to produce an error signal being provided to a proportional-integral controller to produce the delay compensated control signal, wherein during a first mode of operation of the control system, the system delay compensated control signal is produced in a fuel/air ratio domain, and during a second mode of operation of the control system the system delay compensated control signal is produced in a fuel mass domain;

a transient fuel control filter to adjust the system delay compensated fuel control signal according to an engine temperature dependent time constant and an engine temperature dependent gain to produce an engine temperature dependent delay compensated fuel/air control signal, and a feed forward control to adjust a product of the desired fuel control signal and a sum of one (fuel/air ratio) plus the engine temperature dependent delay compensated fuel control signal based on an anticipated timing of a control system event.

20. The system of claim 19, wherein during the second mode of operation of the control system, the error signal is multiplied by a delayed air mass term to convert the error signal to the fuel mass domain, and the delay compensated control term is divided by an air mass term to convert the delay compensated control signal to the fuel/air ratio domain.

* * * * *